June 23, 1953  J. SORTEBERG  2,643,055
AUTOMATICALLY BALANCED FORCE BRIDGE
Filed Aug. 26, 1952
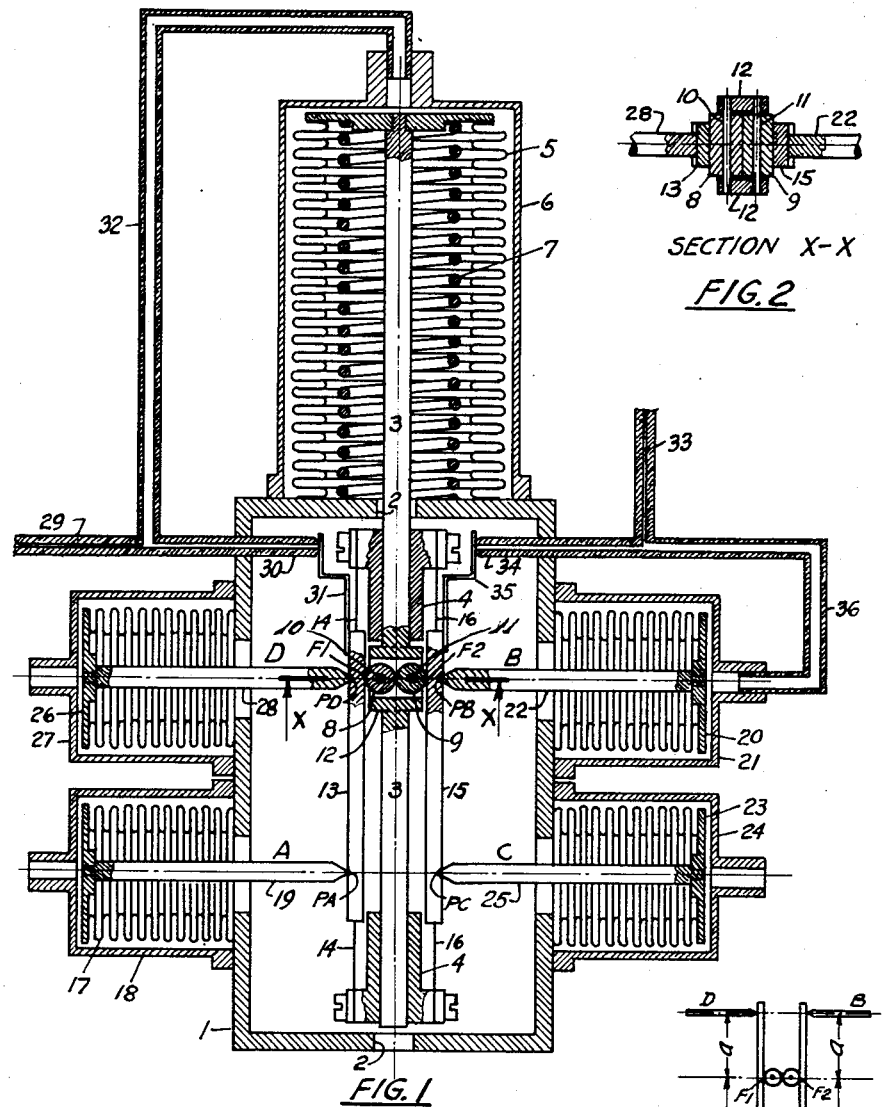
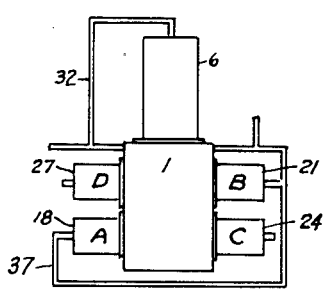
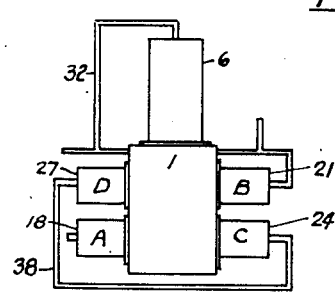

Patented June 23, 1953

2,643,055

UNITED STATES PATENT OFFICE 2,643,055

AUTOMATICALLY BALANCED FORCE BRIDGE

Johannes Sorteberg, Bath, Pa.

Application August 26, 1952, Serial No. 306,409

1 Claim. (Cl. 235—61)

The object of my present invention is to devise a novel automatically balanced force bridge which can be employed to solve problems of multiplication, division and square root extraction.

A further object of the invention is to devise a mechanical expression for the aquation $$A \times B = C \times D$$

where A, B, C, or D represent forces.

With the foregoing and other objects in view as will hereinafter clearly appear, my invention comprehends a novel automatically balanced force bridge.

For the purpose of illustrating the invention, I have shown in the accompanying drawings preferred embodiments of it which I have found in practice to give satisfactory and reliable results. It is, however, to be understood that the various instrumentalities of which the invention consists can be variously arranged and organized, and the invention is not limited except by the scope of the appended claim to the exact arrangement and organization of these instrumentalities as herein disclosed.

Figure 1 is a sectional view of an automatically balanced force bridge as used for multiplication and/or division, showing only the principal elements.

Figure 2 is a sectional detail, the section being taken on lines $x$—$x$ of Figure 1.

Figure 3 is a schematic view of the principal elements of the invention as used for square root extraction.

Figure 4 is a schematic view showing the principal elements of the invention as used for hyperbolic functions.

Figure 5 is a detail view showing the action of forces around their fulcrums.

Similar numerals of reference indicate corresponding parts.

Referring to the drawings:

A housing 1 has end apertures 2 for linear movement of a rod 3 in bearings 4, the rod at one end being connected to a bellows 5 in a casing 6 and opposed by a spring 7. Rollers 8 and 9 on shafts 10 and 11 are mounted in a carrier 12 fixed to the rod 3 to be moved thereby.

Weighbeams 13 and 15 are spaced by the rollers 8 and 9, and the contact line of the weighbeams and rollers becomes fulcrums F1 and F2. The weighbeams are suspended by leaf springs 14 and 16.

A bellows 17 within a casing 18 connected with the housing 1 has a rod 19 perpendicular to and contacting the weighbeams 13; and a bellows 20 within a casing 21 connected with the housing 1 has a rod 22 perpendicular to and contacting the weighbeam 15.

A bellows 23 within a casing 24 connected with the housing 1 has a rod 25 perpendicular to and contacting with the weighbeam 15; and a bellows 26 within a casing 27 connected with the housing 1 has a rod 28 perpendicular to and contacting the weighbeam 13. The rods 19, 22, 25 and 28 contact their weighbeams at points PA, PB, PC and PD. For practical reasons, it is desirable to make the distance between contact points PA and PD the same as between contact points PB and PC, and to make the arrangement such that a line through the center of the rollers 8 and 9 will be perpendicular to the weighbeams and will intersect the weighbeams at equal distances from contact points PA, PC, or PB and PD.

Air is introduced through a restriction 29 to a nozzle 30 facing extension 31 of weighbeam 13. The passage between the restriction 29 and the nozzle 30 is connected to bellows casing 6 by a passage 32.

Air is also introduced through a restriction 33 to a nozzle 34 facing extension 35 of weighbeam 15. The passage between restriction 33 and nozzle 34 is connected to bellows casing 21 by a passage 36. Restrictions 29 and 33 are approximately one half the diameter of nozzles 30 and 34.

In normal operation, forces represented by A, B, C, and D are exerted on the weighbeams through the medium of bellows 17, 20, 23 and 26 and their rods 19, 22, 25 and 28. Forces A, C, and D may be transmitted to the weighbeams by other means than air responsive media, for example by springs, weights, etc.

When the system is in balance, it will be evident that the moments of forces A, B, C, and D around fulcrums F1 and F2 present the following equations:

(1) $A \times b = D \times a$, and $B \times a = C \times b$. See Fig. 5.

It follows from the above equations by multiplication:

(3) $A \times B \times a \times b = C \times D \times a \times b$ or $A \times B = C \times D$ From this equation anyone of the forces can be expressed as a function of the other three, for example:

(4) $C = A \times B \div D$, which embodies multiplication and division.

If square root extraction is desired, it is only necessary to interconnect bellows casings 18 and 21 by a passage 37, see Figure 3, to make force $A = B$. The effective area of bellows 17 and 20 must in this case be identical. Equation 4 will then take form $A^2$ (or $B^2$)=$C \times D$, or $$A \text{ (or } B) = \sqrt{C \times D}$$

Of special significance is a connection between bellows casings 24 and 27 by passage 38, see Figure 4. In this case, Equation 4 takes the form of $C^2$ (or $D^2$)=$A \times B$, provided bellows areas 23 and 26 in this case are identical. For chosen values of C (or D) the product $A \times B$ equals constant. This is the equation for an equilateral hyperbola.

It will be seen that this method of multiplication, division or square root extraction is independent of the characteristics of the forces used to position the rollers 8 and 9 along the weighbeams.

When the system is used for multiplication and/or division, it functions as follows:

Assume a change in force A. This will upset the balance on weighbeam 13 with the effect that weighbeam extension 31 will move either towards or away from the nozzle 30, increasing or decreasing as the case may be the back pressure transmitted to bellows 5 through passage 32. Bellows 5 will reposition rollers 8 and 9 (fulcrums F1 and F2) until balance is restored on weighbeam 13. The movement of rollers 8 and 9 will simultaneously upset the balance of weighbeam 15 with the result that its extension 35 will move either towards or away from the nozzle 34, as the case may be. This in turn will increase or decrease the back pressure transmitted to bellows 20 through passage 36 until balance is restored.

When the system is used for square root extraction, the functioning is essentially as above described except that the pressure on bellows 17 is the same as on bellows 20 at all times due to their interconnection.

In all cases, the variations in pressure and the movement of the rollers take place simultaneously as a continuous process until the system is in equilibrium.

Having thus described my invention, what I claim as new and desire to secure by Letters Patent is:

An automatically balanced force bridge, comprising two weighbeams, means for transmitting a force to each end of said weighbeams, a movable fulcrum for each weighbeam, said fulcrums being in fixed relationship to each other to move in unison along their weighbeams, means for automatically balancing the moments on one weighbeam by moving its fulcrum, and means for balancing the moments on the other weighbeam by changing the force transmitted to one end of such weighbeam.

JOHANNES SORTEBERG.

References Cited in the file of this patent

UNITED STATES PATENTS

| Number | Name | Date |
|---|---|---|
| 2,073,838 | Hammond et al. | Mar. 16, 1937 |
| 2,217,642 | Luhrs | Oct. 8, 1940 |
| 2,317,293 | Newell | Apr. 20, 1943 |
| 2,394,284 | Berges | Feb. 5, 1946 |
| 2,507,498 | Brown | May 16, 1950 |